United States Patent Office.

SAMUEL GALBRAITH, OF PINE-GROVE PLANTATION, LOUISIANA.

Letters Patent No. 68,867, dated September 17, 1867.

IMPROVED COMPOUND FOR DESTROYING INSECTS.

The Schedule referred to in these Letters Patent and making part of the same.

TO ALL WHOM IT MAY CONCERN:

Be it known that I, SAMUEL GALBRAITH, of Pine-Grove Plantation, in the parish of Jefferson, and State of Louisiana, have invented a new and useful Composition for Destroying Insects; and I do hereby declare the following to be a full, clear, and exact description thereof.

The object of this invention is to provide a cheap composition which will effectually destroy all insects injurious to vegetation without damaging the plants upon which it may be used, and which can be readily and easily made and applied.

To accomplish this object I take equal parts, by measure, of quicklime and chloride of sodium or common salt. These I pulverize thoroughly, so as to reduce them to an impalpable powder, and thoroughly mix them together.

I apply the composition thus made by shaking it from a fine sieve over the plants upon which the insects are committing their depredations. The sieve should be a very fine one, either a hair sifter or a common sieve lined with muslin, as the perfect operation of the composition depends upon the fineness to which the powder is reduced.

The quicklime is perfectly fatal to insects. My object in using the salt, which in itself is also a deadly poison to insects, is to hold the quicklime in solution with the aid of the night dew on the leaves of the plant. This office it effectually performs, rendering the composition also fatal to all species of insects that infest the vegetable world.

This composition I have thoroughly tested, and I have demonstrated by actual experiment that it is instantly fatal to worms and insects. Among the insects I have thus operated upon are the army-worm or cotton-caterpillar, so destructive to the cotton-plant in the South, the locust or grasshopper, which destroys so vast an amount of agricultural property in Texas, Mexico, and the South American republics, and the boll-worm and cut-worm, that are found wherever vegetable roots grow. In no case will this composition, if its ingredients are thoroughly pulverized and mingled, fail to exterminate these pests of vegetation wherever it is applied.

This composition is cheap, and can be easily applied. One flour-barrel full will suffice for forty acres of ground. One man can apply it to from five to ten acres per day. Neither the cost of the materials, which are within reach of every farmer at all times, nor the labor of mixing them, amounts to anything in comparison with the loss to which every farm is annually subjected by the ravages of the insect tribes.

Having thus described my invention, what I claim as new, and desire to secure by Letters Patent, is—

The composition above described, when compounded and used in the manner and for the purpose specified.

SAMUEL GALBRAITH.

Witnesses:
HENRY FABER,
JULES SIRMUELLO.